United States Patent [19]

Sasaki et al.

[11] Patent Number: 4,737,633
[45] Date of Patent: Apr. 12, 1988

[54] INCLINED FILTER FOR PHOTOELECTRIC TOUCH PANEL

[75] Inventors: Hiroaki Sasaki; Kazuo Hasegawa; Junichi Ouchi, all of Furukawa, Japan

[73] Assignee: Alps Electric Co., Ltd., Japan

[21] Appl. No.: 853,609

[22] Filed: Apr. 18, 1986

[30] Foreign Application Priority Data

Apr. 18, 1985 [JP] Japan .................. 60-83203

[51] Int. Cl.4 .................. G01V 9/04
[52] U.S. Cl. .................. 250/221
[58] Field of Search ........... 250/221, 222.1, 237 R, 250/208, 209; 340/555, 556, 557

[56] References Cited

U.S. PATENT DOCUMENTS 4,590,410 5/1986 Jonsson .................. 250/222.1
4,636,632 1/1987 Ando .................. 250/221

Primary Examiner—David C. Nelms
Attorney, Agent, or Firm—Guy W. Shoup

[57] ABSTRACT

A filter for a photoelectric touch panel disposed in front of arrays, formed on a framework on the circumference of a screen, of aligned light emitting elements and photosensitive elements characterized in that the same is arranged to be slanted to spread outward.

1 Claim, 1 Drawing Sheet

INCLINED FILTER FOR PHOTOELECTRIC TOUCH PANEL

BACKGROUND OF THE INVENTION

1. Field of the Invention

The present invention relates to a filter for photoelectric touch panel adapted to form a matrix of infrared beams in front of its screen and, when a finger or a pen touches the screen, the infrared beams corresponding to the touched position are shielded and the coordinates are input to a computer.

2. Description of the Prior Art

As a filter for a photoelectric touch panel of the described type such as shown in FIG. 3 has in general been in use. Referring to FIG. 3, 1 denotes a filter. The filter 1 formed into a frame and having a smooth surface is disposed in front of arrays 2 and 2a of aligned LEDs 3, 3 as light emitting elements and aligned phototransistors 4, 4 as photosensitive elements. The arrays are arranged on a framework on the circumference of a screen.

Now, chiefly concerning the LEDs 3 and phototransistors 4 located at end portions of the arrays 2 and 2a, it is found out that, while some beams of light emitted from the LEDs 3 will straightly advance and be properly received by the phototransistors 4, some other beams emitted from the same will advance so as to be reflected at around the center of the filter portion 1b perpendicularly crossing the filter portion 1a disposed in front of the LED 3 and erroneously received by the phototransistors 4. In such a case, even if the beam advancing straight can be shielded, the shielding is not effected as an input to a computer and such was a cause of malfunction of the apparatus in the prior art.

SUMMARY OF THE INVENTION

A primary object of the invention is to solve the mentioned problem in the prior art and to provide a filter for a photoelectric touch panel which eliminates the possibility of the mentioned receipt of the reflected beam and avoid the resultant malfunction.

In order to attain the above mentioned object, the filter of the invention is slanted to spread outward.

DESCRIPTION OF THE PREFERRED EMBODIMENT

Figure 1:
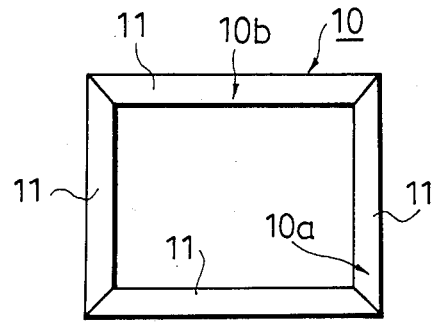
FIG. 1 is a front view of a filter according to the invention.
Figure 2:
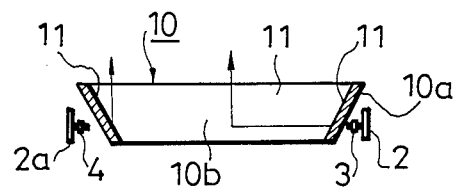
FIG. 2 is a cross-sectional view of the same.
Figure 3:
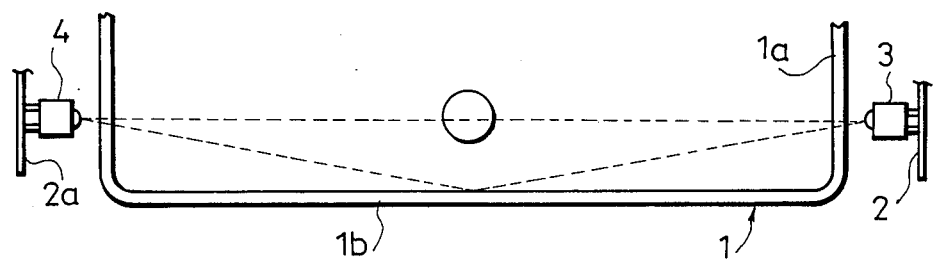
FIG. 3 is a front view showing portion of a filter of the prior art.

A preferred embodiment of the invention will be described with reference to accompanying drawings in the following.

Referring to the drawings, 10 denotes a filter according to the invention. Although the installed position of the filter 10 is the same as before, this filter 10 is slanted at about 45° to spread outward and its surface is made into slanted surface segments 11, 11, . . . . The slanted surface segments 11, 11, . . . cause the beams emitted, chiefly, by the LEDs 3 located at the end portion of the array 2 and diverged to the portion 10b of the filter which perpendicularly crosses the portion 10a of the filter disposed in front of the LEDs 3 to be reflected outwardly and thus enable only the beams advancing straight to be properly received by the opposing phototransistors 4.

According to the invention, as described above, it is attained that only the beam of light advancing straight is received by the corresponding photosensitive element and entering into the same of a reflected beam can be avoided. Therefore, the shielding of the beams in the matrix of the infrared beams is correctly input to the computer and the malfunction can thus be eliminated.

What is claimed is:

1. In a filter for a photoelectric touch panel of the type having opposing arrays of light emitting elements and corresponding light detecting elements around the circumference of a frame for forming a matrix of light beams in front of a screen, the filter having side portions disposed in front of the arrays of light emitting and detecting elements, the improvement wherein said side portions of said filter are inclined at an angle diverging outwardly relative to said screen such that a light beam scattered from an emitted direction from a light emitting element is reflected outwardly from said screen and is not reflected from a side portion erroneously toward a light detecting element.

* * * * *